(12) United States Patent
Winter

(10) Patent No.: US 9,868,637 B2
(45) Date of Patent: Jan. 16, 2018

(54) BROMINE-FACILITATED SYNTHESIS OF FLUORO-SULFUR COMPOUNDS

(75) Inventor: Rolf Winter, Portland, OR (US)

(73) Assignee: AVANTBIO CORPORATION, Vancouver, WA (US)

( * ) Notice: Subject to any disclaimer, the term of this patent is extended or adjusted under 35 U.S.C. 154(b) by 150 days.

(21) Appl. No.: 12/746,717

(22) PCT Filed: Jun. 11, 2009

(86) PCT No.: PCT/US2009/047116
§ 371 (c)(1),
(2), (4) Date: Jun. 7, 2010

(87) PCT Pub. No.: WO2009/152385
PCT Pub. Date: Dec. 17, 2009

(65) Prior Publication Data
US 2010/0260659 A1  Oct. 14, 2010

Related U.S. Application Data

(60) Provisional application No. 61/060,642, filed on Jun. 11, 2008, provisional application No. 61/153,180, filed on Feb. 17, 2009, provisional application No. 61/176,674, filed on May 8, 2009.

(51) Int. Cl.
*C01B 17/45* (2006.01)

(52) U.S. Cl.
CPC ........ *C01B 17/4507* (2013.01); *C01B 17/453* (2013.01); *C01B 17/4523* (2013.01); *C01P 2002/82* (2013.01)

(58) Field of Classification Search
CPC .................... C01B 17/4507; C01B 17/4523
USPC ........................................ 423/467, 469, 489
See application file for complete search history.

(56) References Cited

U.S. PATENT DOCUMENTS

| | | | | |
|---|---|---|---|---|
| 2,992,073 | A * | 7/1961 | Tullock ........................ | 423/469 |
| 4,082,839 | A | 4/1978 | Eibeck .......................... | 423/489 |
| 4,390,511 | A * | 6/1983 | Oda et al. ..................... | 423/469 |
| 4,859,441 | A | 8/1989 | Lambard | |
| 5,639,435 | A | 6/1997 | Miller ........................... | 423/469 |
| 6,764,670 | B2 | 7/2004 | Henderson | |
| 6,869,582 | B2 | 3/2005 | Bailey, III .................... | 423/460 |
| 7,014,831 | B2 | 3/2006 | Eicher ........................... | 423/468 |
| 8,367,026 | B2 | 2/2013 | Omotowa | |
| 2011/0104032 | A1 * | 5/2011 | Omotowa ..................... | 423/260 |

FOREIGN PATENT DOCUMENTS

| | | |
|---|---|---|
| AU | 2009257401 | 12/2009 |
| EP | 0247924 | 12/1987 |
| EP | 1443021 | 8/2004 |

OTHER PUBLICATIONS

"The Effect of Temperature on Reaction Rates", 5 pages, 2007, taken from https://web.archive.org/web/20070102150941/http://www.chemguide.co.uk/physical/basicrates/temperature.html.*
Brauer, "Handbook of Preparative Inorganic Chemistry", vol. 1, second edition, 1962, pp. 1, 401-403.*
Chinese Office Action for related Chinese Patent Application No. 200980101550.X (with Translation).
European Search Report dated Mar. 27, 2014 in European Application No. 09763673.2.
International Search Report and Written Opinion dated Jan. 26, 2010 in International Application No. PCT/US2009/047116.
Office Action dated Aug. 27, 2012 in Chinese Application No. 200980101550.X.
Office Action dated Oct. 15, 2013 in Japanese Application No. 2011513708.
Office Action dated Mar. 5, 2014 in Chinese Application No. 200980101550.X.
Office Action dated May 12, 2014 in Canadian Application No. 2,727,543.
Xu, et al., "Arylsulfur Trifluorides: Improved Method of Synthesis and Use as in situ Deoxofluorination Reagents", Journal of Fluorine Chemistry 132, pp. 482-488 (2011).
Allen HR Maxon RN Inorganic Syntheses vol. 1, 1939.
Office Action dated Jun. 5, 2015 in European Application No. 09763673.2.
Gmelins, "Der Anorganischen Chemie", System No. 9, 1963.
Office Action dated Jan. 30, 2015 in Canadian Application No. 2727543.
Examination Report dated Oct. 23, 2013 in Australian Application No. 2009257401.
Office Action dated May 17, 2015 in Russian Application No. 2011100166.
Office Action dated Jun. 4, 2013 in Chinese Application No. 200980101550.X.
Office Action dated Jul. 17, 2015 in Korean Application No. 10-2011-7000588.
Examination Report dated Jul. 2, 2013 in Australian Patent Application 2009257401.
Office Action dated Sep. 29, 2014 in Canadian Application No. 2727543.
Office Action dated Sep. 30, 2014 in Japanese Application No. 2011-513708.
Seel, et al., "Uber Fluorsulfinate Z Anorg Allg Chemie", 1955.
Winter, et al., "A Simplified and Efficient Bromine-Facilitated SF4-Prearation Method", Journal of Fluorine Chemistry, 2010, 131, pp. 780-783.

(Continued)

*Primary Examiner* — Ngoc-Yen Nguyen
(74) *Attorney, Agent, or Firm* — Lee & Hayes PLLC; Trevor E. Lind

(57) ABSTRACT

Described herein are methods for the bromine-facilitated synthesis of fluoro-sulfur compounds, that include $SF_4$, $SF_5Cl$, $SF_5Br$ and $SF_6$. The methods described herein generally require lower temperature and pressure, produce higher yields, require less time, do not use corrosive or costly reactants and solvents that are commonly used in the synthesis of the fluoro-sulfur compounds, and do not produce deleterious waste products when compared to previously-used methods.

15 Claims, No Drawings

(56) References Cited

OTHER PUBLICATIONS

Herron, "Thermochemical Data on Gas Phase Compounds of Sulfur, Fluorine, Oxygen, and Hydrogen Related to Pyrolysis and Oxidation of Sulfur Hexafluoride", J. Phys. Chem. Ref. Data, vol. 16, No. 1, 1987, pp. 1-6.
Johnson, "Some Thermodynamic Aspects of Inorganic Chemistry", Cambridge University Press, 1968, pp. 36-59.
Lees, et al., "Chemistry for OCR A", Heinemann Educational Publishers, 2001, pp. 48-49.
Liley, et al., "Heats and Free Energies of Formation of Inorganic Compounds", Section 2: Physical and Chemical Data, Table 2-220.
Offce Action dated Jan. 4, 2016 in Canadian Application No. 2,912,893.
Search Report & Written Opinion dated Jan. 26, 2010 in PCT Application No. PCTUS2009047116.
Office Action dated Apr. 25, 2016 for Canadian Patent Application No. 2912893.
Office Action dated Feb. 24, 2016 for Indian Patent Application No. 74/KOLNP/2011.
Winter, et al., "An Improved and Facile Preparation of $SF_5$ Br"— Journal of Fluorine Chemistry 89, 105-106 (1998).

* cited by examiner

BROMINE-FACILITATED SYNTHESIS OF FLUORO-SULFUR COMPOUNDS

CROSS REFERENCE TO RELATED APPLICATIONS

This application is a 371 of International Application No. PCT/US2009/047116 filed on Jun. 11, 2009, which claims the benefit of U.S. Provisional Patent Application No. 61/060,642, filed Jun. 11, 2008, U.S. Provisional Patent Application No. 61/153,180, filed Feb. 17, 2009, and U.S. Provisional Patent Application No. 61/176,674, filed May 8, 2009, the entire disclosures each of which are incorporated herein by reference.

FIELD OF THE INVENTION

Disclosed herein are methods of synthesizing fluoro-sulfur compounds. The disclosed methods use bromine to promote the synthesis of fluoro-sulfur compounds while avoiding the use excessive temperatures, electrochemical preparation, or the use of traditionally used solvents or reactants generally deemed less desirable due to toxicity, excess reactivity or cost.

BACKGROUND OF THE INVENTION

A number of fluoro-sulfur compounds have beneficial applications. For example, sulfur tetrafluoride ($SF_4$) is a widely-used compound produced yearly at the metric ton level, which can be utilized as a deoxofluorinating reagent in converting carboxylic acids, aldehydes, some alcohols and ketones into their corresponding deoxofluorine derivatives (i.e. R—$CF_3$, R—$CHF_2$, RF, RR'—$CF_2$). $SF_4$ is also utilized as an etching agent in the electronics industry. Moreover, $SF_4$ can be utilized as a precursor for the synthesis of other important fluorinated products such as, without limitation, pentafluorosulfur chloride ($SF_5Cl$), pentafluorosulfur bromide ($SF_5Br$), and sulfur hexafluoride ($SF_6$).

Sulfur hexafluoride ($SF_6$), is a compound that is produced by the thousands of metric tons each year, and its worldwide uses include: acting as a PCB replacement and an inert dielectric medium for electrical equipment, the etching of semiconductors, the casting of magnesium, the manufacture of thermal windows, a source of thrust in some rocket propulsion systems, the tracing of air flow through industrial systems, a tamponade for retinal holes of the eye and in medical imaging.

Compounds harboring fluoro-organic modifications such as R—$CF_3$, R—$CHF_2$, RF, RR'—$CF_2$ and $RSF_5$, have been used in a variety of applications including fluorinated therapeutic and diagnostic drugs, pesticides, herbicides, antibiotics, perfluorinated blood substitutes, fungicides, polymer solvents, polymers, lubricants, liquid crystals, surface-active agents, high-boiling solvents, stable solvents, electrically conducting polymers and the like. Utilizing an $SF_5$ group in the place of $CF_3$ offers many advantages. Particularly, the $SF_5$ group possesses greater electronegativity than $CF_3$. Moreover, compounds containing $SF_5$ may be further distinguished by their outstanding chemical properties including high to extreme chemical and thermal stability, hydro- and oleophobicity, lipophilicity, high-density, reduction of shock sensitivity in explosives, low boiling point, low polarizability and low surface tension.

While $SF_5$-derivatives offer these advantages, they have been difficult to synthesize. The difficulty of obtaining such compounds is in part related to the difficulty of obtaining sufficient and affordable quantities of $SF_5Cl$ or $SF_5Br$, which are the principal chemical reagents used to synthesize and obtain a number of organic or inorganic derivatives that bear the $SF_5$-radical moiety. $SF_5Cl$, particularly, is a valuable reactant to produce $SF_5$-radical bearing derivatives of (sulfur hexafluoride) $SF_6$ and may be reduced to disulfur decafluoride ($S_2F_{10}$) with the latter being converted into pentafluorosulfur bromide ($SF_5Br$). $SF_5Cl$ can also be used in the synthesis of $SF_6$. It is of interest that $SF_5Cl$ can be particularly used in the manufacture of $SF_6$ by a pyrogenic route (e.g. U.S. Pat. No. 4,390,511), whereby a disproportionation occurs according to the following reaction:

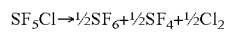

$$SF_5Cl \rightarrow \tfrac{1}{2}SF_6 + \tfrac{1}{2}SF_4 + \tfrac{1}{2}Cl_2$$

In this method, $SF_6$ is obtained that is free of $S_2F_{10}$, a compound believed to be highly toxic and a by-product of the manufacture of $SF_6$ by the reaction of sulfur with fluorine. Accordingly, the use of $SF_5Cl$ can be used to produce high purity $SF_6$.

Collectively, a variety of methods have been demonstrated as processes for the production of $SF_6$ and include U.S. Pat. Nos. 2,883,267, 2,912,307, 3,054,661, 3,345,277, 3,399,036, 3,373,000, 4,390,511, 5,639,435 and Japanese Patent No. 7,625,497. These methods frequently employ electrochemical preparation, high reaction temperatures and pressures, and/or utilize highly-reactive and/or costly reactants that can include $F_2$, $SF_5Cl$, $IF_5$, $SF_4$, ClF and HF.

$SF_5Br$ is also a valuable chemical compound that has been demonstrated as a reactant for the efficient production of $SF_5$-radical bearing chemicals; also known as derivatives of $SF_6$.

Currently available methods of producing fluoro-sulfur compounds suffer a number of drawbacks. The drawbacks generally include the use of excessive temperatures, electrochemical preparation, expensive and/or hazardous reactants, the requirement for numerous successive steps or long reaction times, the production of low or variable yields and/or the generation of toxic by-products. Accordingly, there is room for improvement in the synthesis of fluoro-sulfur compounds.

SUMMARY OF THE INVENTION

Described herein are methods for the synthesis of fluoro-sulfur compounds, more specifically $SF_4$, $SF_5Cl$, $SF_5Br$ and $SF_6$. The methods described herein generally require lower temperatures and pressure, produce high yields, in some cases require less time, do not use highly reactive oxidants or costly reactants and solvents that are commonly used in the synthesis of fluoro-sulfur compounds, and do not produce deleterious waste products when compared to previously-used methods. The methods and examples described herein represent a significant improvement over the prior art, as the disclosed reactions of the invention producing $SF_4$ and $SF_5Cl$ can be executed at ambient temperatures (e.g. about 5-40° C.), or mildly elevated temperatures.

One embodiment disclosed herein includes a method of producing a fluoro-sulfur compound or a compound made using the produced fluoro-sulfur compound comprising: admixing $Br_2$, a metal fluoride reactant, and a sulfur reactant thereby initiating a reaction that produces a yield of the fluoro-sulfur compound of greater than about 10%. In another embodiment, the admixing further includes $Cl_2$. In another embodiment, the reaction proceeds at temperature of about 10 to about 400° C. In another embodiment, either $S_2F_{10}$ or BrF, $BrF_3$, $BrF_5$, $CsBrF_4$, $CsBrF_2$, acetonitrile, Dioxane, ClF, ClF$_3$, NOF, HF, F$_2$, (HF)$_n$.amine, IF$_5$ or combinations thereof are not added to the reaction.

Embodiments disclosed herein also include methods of producing SF$_4$ or a compound made using the produced SF$_4$. In one embodiment the method includes admixing a sulfur reactant, a metal fluoride reactant, and a Br$_2$ reactant thereby initiating a reaction that produces SF$_4$ at a yield of greater than about 10%. In another embodiment of producing SF$_4$ or a compound made using the produced SF$_4$, the reaction proceeds at a temperature of about 10 to about 400° C.

In another embodiment of producing SF$_4$ or a compound made using the produced SF$_4$, the sulfur reactant is S and the metal fluoride is KF and the admixing occurs at a stoichiometric ratio of about 4 KF to about 2Br$_2$ to about 1 S and the reaction proceeds at a temperature of about 10 to about 400° C.

In another embodiment of producing SF$_4$ or a compound made using the produced SF$_4$, the metal fluoride is an alkaline earth metal fluoride, an alkali metal fluoride, CsF, RbF, KF, BaF$_2$, SrF$_2$ or a combination thereof and/or the sulfur reactant is S, S$_2$Cl$_2$, SCl$_2$, S$_2$Br$_2$, SBr$_2$ or a combination thereof.

In an additional embodiment of producing SF$_4$ or a compound made using the produced SF$_4$, the method includes admixing a sulfur reactant, a metal fluoride reactant, a Cl$_2$ reactant and a Br$_2$ reagent thereby initiating a reaction that produces SF$_4$ at a yield of greater than about 10%. In another embodiment of producing SF4 or a compound made using the produced SF$_4$, the reaction proceeds at a temperature of about 10 to about 400° C.

In another embodiment of producing SF$_4$ or a compound made using the produced SF$_4$, the sulfur reactant is S and the metal fluoride is KF and the admixing occurs at a stoichiometric ratio of about 4 KF to about 1 Br$_2$ to about 1 S to about 2Cl$_2$ or the sulfur reactant is SCl$_2$ and the metal fluoride is KF and the admixing occurs at a stoichiometric ratio of about 4 KF to about 1 Br$_2$ to about 1 SCl$_2$ to about 1 Cl$_2$ and the reaction proceeds at a temperature of about 10 to about 400° C.

In another embodiment of producing SF4 or a compound made using the produced SF$_4$, the metal fluoride is an alkaline earth metal fluoride, an alkali metal fluoride, CsF, RbF, KF, BaF$_2$, NaF, SrF$_2$ or a combination thereof and/or the sulfur reactant is S, S$_2$Cl$_2$, SCl$_2$, S$_2$Br$_2$, SBr$_2$ or a combination thereof.

Embodiments disclosed herein also include methods of producing SF$_5$Cl or a compound made using the produced SF$_5$Cl. In one embodiment the method includes admixing a Cl$_2$ reactant, a sulfur reactant, a metal fluoride reactant, and Br$_2$ reagent thereby initiating a reaction that produces the SF$_5$Cl at a yield of greater than about 50%. In another embodiment of producing SF$_5$Cl or a compound made using the produced SF$_5$Cl, the reaction proceeds at a temperature of about 10 to about 200° C.

In another embodiment of producing SF$_5$Cl or a compound made using the produced SF$_5$Cl, the sulfur reactant is S and the metal fluoride is KF and the admixing occurs at a stoichiometric ratio of about 5 KF to about 1 Br$_2$ to about 1 S to about 3Cl$_2$ or the sulfur reactant is SF$_4$ and the metal fluoride is KF and the admixing occurs at a stoichiometric ratio of about 1 KF to about 1 Br$_2$ to about 1 SF$_4$ to about 1 Cl$_2$ or the sulfur reactant is SCl$_2$ and the metal fluoride is KF and the admixing occurs at a stoichiometric ratio of about 5 KF to about 1 Br$_2$ to about 1 SCl$_2$ to about 2Cl$_2$ and the reaction proceeds at a temperature of about 10 to about 200° C.

In another embodiment of producing SF$_5$Cl or a compound made using the produced SF$_5$Cl, the metal fluoride is an alkaline earth metal fluoride, an alkali metal fluoride, CsF, RbF, KF, BaF$_2$, SrF$_2$ or a mixture thereof and/or the sulfur reactant S, S$_2$Cl$_2$, SCl$_2$, SF$_4$ or a combination thereof.

Embodiments disclosed herein also include methods of producing SF$_5$Br or a compound made using the produced SF$_5$Br. In one embodiment the method includes admixing a Br$_2$ reactant, a sulfur reactant, and a metal fluoride reactant thereby initiating a reaction that produces SF$_5$Br at a yield of greater than about 50%. In another embodiment of producing SF$_5$Br or a compound made using the produced SF$_5$Br, either S$_2$F$_{10}$ or BrF, BrF$_3$, BrF$_5$, CsBrF$_4$, CsBrF$_2$ or mixtures thereof are not added to the reaction. In another embodiment of producing SF$_5$Br or a compound made using the produced SF$_5$Br, the reaction proceeds at a temperature of about 10 to about 140° C.

In another embodiment of producing SF$_5$Br or a compound made using the produced SF$_5$Br, the sulfur reactant is SF$_4$ and the metal fluoride is AgF and the admixing occurs at a stoichiometric ratio of about 1 AgF to about 1 Br$_2$ to about 1 SF$_4$ or the sulfur reactant is SF$_4$ and the metal fluoride is AgF$_2$ and the admixing occurs at a stoichiometric ratio of about 2AgF$_2$ to about 3 Br$_2$ to about 4 SF$_4$ and the reaction proceeds at a temperature of about 10 to about 140° C.

In another embodiment of producing SF$_5$Br or a compound made using the produced SF$_5$Br, the metal fluoride is an alkaline earth metal fluorides, an alkali metal fluorides, AgF$_2$, AgF, AuF, MnF$_3$, PbF$_4$, CeF$_4$ or a mixture thereof.

Embodiments disclosed herein also include methods of producing SF$_6$ or a compound made using the produced SF$_6$. In one embodiment, the method includes: admixing a Br$_2$ reactant, an SF$_4$ reactant, and a metal fluoride reactant thereby initiating a reaction that produces SF$_6$ at a yield of greater than about 50%. In another embodiment of producing SF$_6$ or a compound made using the produced SF$_6$, the reaction proceeds at a temperature of about 10 to about 400° C.

In another embodiment of producing SF$_6$ or a compound made using the produced SF$_6$, the sulfur reactant is SF$_4$ and the metal fluoride is CoF$_3$ and the admixing occurs at a stoichiometric ratio of about 2 CoF$_3$ to about 1 Br$_2$ to about 1 SF$_4$ and the reaction proceeds at a temperature of about 10 to about 400° C.

In another embodiment of producing SF$_6$ or a compound made using the produced SF$_6$, the metal fluoride is selected from the group consisting of an alkaline earth metal fluoride, an alkali metal fluoride, CoF$_3$, MnF$_3$, PbF$_4$, CeF4 or a mixture thereof.

DETAILED DESCRIPTION OF THE INVENTION

Described herein are methods for the synthesis of fluoro-sulfur compounds in the presence of Br$_2$. In certain exemplary embodiments the fluoro-sulfur compounds are SF$_4$, SF$_5$Cl SF$_5$Br and SF$_6$. The methods disclosed herein involve the mixing of readily available and relatively inexpensive reactants. When compared to previously-used approaches, the methods described herein generally require lower temperatures and pressure, produce high yields, require less time, do not use excessively reactive or costly reactants and solvents that are frequently utilized in the synthesis of the fluoro-sulfur compounds, do not produce deleterious waste products or one or more of the above in various combinations.

Disclosed methods of synthesizing $SF_4$ utilize $Br_2$ in both the presence and absence of $Cl_2$, whereas disclosed methods of synthesizing $SF_5Cl$ utilize $Br_2$ in the presence of $Cl_2$. Disclosed methods of synthesizing $SF_4$ and $SF_5Cl$ can utilize $Br_2$ in the absence of excessive temperature and pressure, and, in certain embodiments, in the absence of acetonitrile, Dioxane, ClF, ClF$_3$, NOF, HF, F$_2$, (HF)$_n$.amine and/or IF$_5$. Disclosed methods of synthesizing $SF_5Br$ utilize $Br_2$ and can be carried out in the absence of high reaction temperatures and pressures, and in certain embodiments, in the absence of $S_2F_{10}$, BrF$_3$, BrF$_5$, CsBrF$_4$ and/or CsBrF$_2$. Disclosed methods of synthesizing $SF_6$ utilize $Br_2$ and can be carried out in the absence of electrochemical preparation, high reaction temperatures and/or pressures, and, in certain embodiments, in the absence of F$_2$, $SF_5Cl$, IF$_5$, $SF_4$, ClF and/or HF.

As used herein "metal fluoride (MF)" encompasses a variety of mono or multivalent MFs including, without limitation, alkaline earth fluorides and alkali metal fluorides and can particularly include, without limitation, CoF$_3$, CeF$_4$, MnF$_3$, PbF$_4$, CsF, RbF, KF, BaF$_2$, SrF$_2$, AgF$_2$, AgF and AuF.

As used herein, the term "about" is used to indicate that a value includes the standard deviation of error for the device or method being employed to determine the value.

In one example embodiment, the synthesis of $SF_4$ is described. One example synthesis reaction for $SF_4$ can proceed as follows in reaction I:

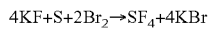

4KF+S+2Br$_2$→SF$_4$+4KBr    I.

In reaction I, the $SF_4$-producing reaction can proceed at autogenous or elevated reaction pressures at ambient temperatures of about 10 to about 27° C., or at a mildly-elevated temperatures of up to about 80° C., or even at higher temperatures that are below those (about 400 to about 500° C.) which promote $SF_4$ to disproportionate into S and $SF_6$. Accordingly, the described methods do not require excessive temperatures or pressures or require the use of unusually reactive or costly reactants or solvents that are commonly used in the synthesis of $SF_4$, such as, but not limited to acetonitrile, Dioxane, HF, F$_2$, Cl$_2$, (HF)$_n$.amine and IF$_5$.

The described reaction I can produce yields ranging from about 57 to about 96% or greater, in a time frame of several hours to several days. Due to the low cost of the reagents used, modifying the reaction to produce lower yields can also be commercially advantageous. In one embodiment, yields of 10% or higher can be produced.

This reaction does not create or leave behind undesirable side products. Only $Br_2$, MFs and sulfur bromides that can easily be removed and discarded or recycled into subsequent production runs of $SF_4$ or other unrelated chemical reactions, are created. Moreover, the disclosed reaction produces little or no gases, other than $SF_4$, making purification of the $SF_4$ end-product a simple process. Particularly, low boiling constituents (S$_{F4}$) or excess unused $Br_2$ can be separated by lowering the temperature and transferring into a cold trap.

This described reaction I provides a method for synthesizing $SF_4$ employing $Br_2$ in the absence of $Cl_2$. The absence of $Cl_2$ in this reaction prevents the formation of $SF_5Cl$ when $SF_4$ is the desired $SF_4$ end-product.

In another example embodiment, either S, $Br_2$, or both S and $Br_2$ can be replaced by sulfur bromides (e.g. S$_2$Br$_2$, SBr$_2$) in the production of $SF_4$. In one embodiment, specifically relating to reaction I, S to $Br_2$ molar ratios of greater than about 1.00:2.00 can be used. In alternative embodiments, ratios ranging from about 1.00:0.44 to about 1.00:5.33 can also be used. In another example embodiment, particularly useful MFs in the production of $SF_4$ and $SF_5Cl$ include, without limitation, CsF, RbF, KF, BaF$_2$, SrF$_2$ or a combination thereof.

Further described herein are methods for the production of $SF_5Cl$, and optionally $SF_4$ (in the presence of Cl$_2$), utilizing $Br_2$ as a solvent and/or reactive solvent. In the case of S as a reactant, when $SF_4$ is the desired product, slightly more than about four equivalents of the MF can be used. If $SF_5Cl$ is the desired product, slightly more than about five equivalents of the MF can be used. When $SF_4$ is used as a reactant to produce $SF_5Cl$, an equivalent or slightly larger amount of the MF can be utilized to efficiently produce the $SF_5Cl$. The minimum amount of Cl$_2$ in the reactions can easily be determined by the stoichiometry of the reaction itself. In the present example embodiment, KF is used as the MF, however, a variety of other mono or multivalent MFs can be used.

Example synthesis reactions for $SF_4$ and $SF_5Cl$ in the presence of Cl$_2$ as described above proceed as follows in reactions II-IV:

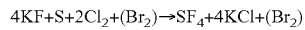

4KF+S+2Cl$_2$+(Br$_2$)→SF$_4$+4KCl+(Br$_2$)    II.

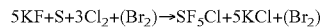

5KF+S+3Cl$_2$+(Br$_2$)→SF$_5$Cl+5KCl+(Br$_2$)    III.

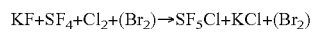

KF+SF$_4$+Cl$_2$+(Br$_2$)→SF$_5$Cl+KCl+(Br$_2$)    IV.

In reactions II-IV above, the $SF_5Cl$- and $SF_4$-producing reactions can proceed at autogenous or elevated reaction pressures, at ambient temperatures of about 10 to about 27° C., or at a mildly-elevated temperatures of up to about 115° C., or, even at higher temperatures that are below those which promote decomposition of $SF_5Cl$ (about 200 to about 400° C.), or cause $SF_4$ to disproportionate into S and $SF_6$ (about 400 to about 500° C.). Accordingly, the described methods do not require excessive temperatures or pressures or require the use of unusually reactive or costly reactants or solvents that are commonly used in the synthesis of $SF_4$ and $SF_5Cl$, such as, but not limited to acetonitrile, Dioxane, ClF, ClF$_3$, NOF, HF, F$_2$, (HF)$_n$.amine and IF$_5$.

The described reaction III above can produce yields of about 88 to about 95% or greater and can theoretically approach 100%, in a time frame of several hours to several weeks. Due to the low cost of the reagents used, modifying the reaction to produce lower yields can also be commercially advantageous. In one embodiment, yields of 50% or higher can be produced. Other lower yields, such as yields as low as 10%, are also within the scope of embodiments disclosed herein.

This reaction does not create or leave behind undesirable side products. $Br_2$ can be easily separated from the reaction products and then $SF_5Cl$ and any excess Cl$_2$ can be collected by cooling the reaction vessel to approximately −80° C. and condensing out $SF_5Cl$ and any excess Cl$_2$ at reduced pressure. Cl$_2$ can be removed from the mixture by storage over elemental sulfur and the recovered sulfur chlorides can be used for a new production batch of either $SF_4$ or $SF_5Cl$. One function of the chlorine in the procedure is to oxidize sulfur to sulfur chlorides (e.g. S$_2$Cl$_2$, SCl$_2$) as the predominant sulfur species, which exchange chlorine for fluorine with a fluoride. Thus, it will not be necessary to dispose of sulfur chlorides as waste. Collectively, the recovered Cl$_2$ as well as the recovered sulfur chlorides and $Br_2$, may be used in a near quantitative fashion, as outlined in the following reactions:

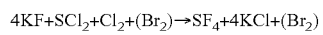

4KF+SCl$_2$+Cl$_2$+(Br$_2$)→SF$_4$+4KCl+(Br$_2$)    V.

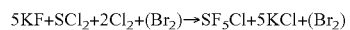

5KF+SCl$_2$+2Cl$_2$+(Br$_2$)→SF$_5$Cl+5KCl+(Br$_2$)    VI.

In the SF$_4$-producing reaction, a small amount of SF$_5$Cl may be formed as a by-product. In each of the reactions, the function of Br$_2$ may be to provide an improved reaction environment with Br$_2$ possibly acting as a solvent, a reactive solvent or with Cl$_2$ forming BrCl from the Br$_2$+Cl$_2$ upon mixing. Interestingly, it has been shown previously, that without the addition of Br$_2$, KF+SF$_4$+Cl$_2$ yields, upon intense heating (about 75 to about 150° C. or about 220 to about 300° C.) only variable amounts (about 5 to about 80%) of SF$_5$Cl (Bekker et al., Isw. Akad. Nauk U.S.S.R., Bull. Ser. Chim. 2575, 1970; U. Jonethal, R. Kuschel, K. Seppelt, J. Fl. Chem. 88, 3, 1998). Thus, the Br$_2$ utilized in the present methods alleviates the requirement for excessive temperature (energy input), and also improves both the yield and the consistency of the yield, as well as the overall ease of production. Moreover, when using S instead of SF$_4$ as the sulfur source to produce SF$_5$Cl, the use of Br$_2$ alleviates both the requirement for SF$_4$ and excessive temperature, as other methods which do not utilize Br$_2$ (excess CsF+S+3 Cl$_2$ at about 175° C.) do not produce meaningful amounts of SF$_5$Cl.

The methods described herein employ the use of Br$_2$ as a solvent or reactive solvent in the production of SF$_5$Cl and SF$_4$, which in turn promotes the transfer of both fluorine and chlorine into the production of the SF$_5$Cl and SF$_4$ end-products.

Alternatively, in the SF$_5$Cl-producing reaction, S and Cl$_2$ may be replaced by sulfur chlorides (e.g. S$_2$Cl$_2$, SCl$_2$) or SF$_4$, if desired. In both the SF$_5$Cl- and SF$_4$-producing reactions described herein, when there is insufficient Br$_2$ present, the reactions are either extremely slow or do not progress at all. Further, in both the SF$_5$Cl- and SF$_4$-producing reactions that utilize Cl$_2$ as a reactant, a Br$_2$ to S molar ratio greater than about 1:1 can be used. Ratios of from about 1:2 to about 2:1 can also be used. Particularly useful MFs in the production of SF$_5$Cl and SF$_4$ include, without limitation, CsF, RbF, KF, BaF$_2$, SrF$_2$ and combinations thereof.

In another example embodiment disclosed herein, the synthesis of SF$_5$Br is described. In the case where SF$_4$ and Br$_2$ are reactants, more than about 1 equivalent of a metal monofluoride (AgF) can be used or about 2 equivalents can be used in the case of a metal difluoride (AgF$_2$). Example synthesis reactions for SF$_5$Br can proceed as follows:

$$AgF+SF_4+Br_2 \rightarrow SF_5Br+AgBr \qquad \text{VII.}$$

$$2AgF_2+4SF_4+3Br_2 \rightarrow 4SF_5Br+2AgBr \qquad \text{VIII.}$$

These reactions can be run at ambient temperatures (about 10 to about 27° C.) or at temperatures up to those at which SF$_5$Br begins to decompose (about 140 to about 150° C.) and at the autogenous pressures generated in closed reactor vessels. Highly-reactive and/or costly reactants that are commonly used to synthesize SF$_5$Br, such as, without limitation, S$_2$F$_{10}$, BrF$_3$, BrF$_5$, CsBrF$_4$ and CsBrF$_2$ are not necessary.

The described reaction can produce yields of about 75% and can theoretically approach 100%, in a time frame of several hours to several days. Due to the low cost of the reagents used, modifying the reaction to produce lower yields can also be commercially advantageous. In one embodiment, yields of 50% or higher can be produced. Other lower yields, such as yields as low as 10%, are also within the scope of embodiments disclosed herein.

The reaction does not create or leave behind undesirable side products. SF$_5$Br and any excess Br$_2$ can be collected by cooling the reaction vessel to approximately −78° C. and condensing out the SF5Br. The Br$_2$ can be easily recycled into subsequent reactions including, without limitation, the production of SF$_5$Br, whereas AgBr can be readily reutilized in subsequent reactions including, without limitation, SF$_5$Br reactions by reforming the metal fluoride (without limitation, AgF or AgF$_2$).

In one example embodiment, the present SF$_5$Br production methods can employ only SF$_4$, a MF, for example and without limitation, AgF or AgF$_2$, and Br$_2$ as reactants. Particularly useful MFs in the production of SF$_5$Br include, without limitation, CeF$_4$, MnF$_3$, PbF$_4$, AgF$_2$, AgF, AuF or a mixture thereof. Further, the methods described herein for producing SF$_5$Br eliminate inefficient multi-step production protocols that are currently used.

In another example embodiment disclosed herein, the synthesis of SF$_6$ is described. In the case where SF$_4$ and Br$_2$ are reactants, more than about 2 equivalents of a MF capable of transferring about one fluorine equivalent, such as CoF$_3$, can be used. An example synthesis reaction for SF$_6$ can proceed as follows:

$$2CoF_3+SF_4+(Br_2) \rightarrow SF_6+2CoF_2+(Br_2) \qquad \text{IX.}$$

Reaction IX shown above can be run at ambient temperatures or theoretically up to temperatures at which SF$_4$ begins to decompose (about 400 to about 500° C.), and at the autogenous pressures generated in closed reactor vessels. Electrochemical preparation, high temperatures and pressures as well as highly-reactive and/or costly reactants (without limitation, F$_2$, SF$_5$Cl, IF$_5$, SF$_4$, ClF and HF) that are commonly used to synthesize SF$_6$ can be avoided.

Due to the low cost of the reagents used, modifying the reaction to produce lower yields can also be commercially advantageous. In one embodiment, yields of 50% or higher can be produced. Other lower yields, such as yields as low as 10%, are also within the scope of embodiments disclosed herein.

In the described reaction IX, the Br$_2$ can be easily recycled into subsequent reactions including, without limitation, the production of additional SF$_6$, whereas CoF$_2$ can be readily re-fluorinated to CoF$_3$ and reutilized in subsequent SF$_6$ reactions as well as other reactions.

In one example embodiment, the present SF$_6$ production methods can employ only SF$_4$, a MF, for example and without limitation, CeF4, MnF3, PbF4, AgF$_2$, AgF, AuF and mixtures thereof as reactants. Further, the methods described herein for producing SF$_6$ eliminate inefficient multi-step production protocols that are currently used.

The reactions described herein for producing SF$_4$, SF$_5$Cl, SF$_5$Br and SF$_6$ can be performed at temperatures below those commonly used in the art. In one example embodiment, the reactions are carried out at or near room (ambient) temperature (about 10 to about 27° C.). In other embodiments, the temperature is from about 10° C. to about 27° C. (ambient), or from about 27° C. to about 115° C. Higher temperatures can theoretically be used, for example, up to about 250° C. to about 500° C. (up to temperatures at which SF$_4$, SF$_5$Cl and SF$_5$Br decompose). Additionally, lower temperatures can be used, for example down to about −10° C.; a temperature at which Br$_2$ would solidify. While permissible, however, these more extreme reaction temperatures are not required.

The reactions described herein for producing SF$_4$, SF$_5$Cl, SF$_5$Br and SF$_6$ can be performed at pressures below those commonly used in the art. In one example embodiment, the reactions are carried out just above atmospheric pressure, at autogenous pressures that are estimated of only up to about 10 atms. In other embodiments, at higher temperatures, the pressure is estimated to be from about 10 atm to about 40 atm. Slightly higher pressures can also be used. For example, it is estimated that up to about 100 atm could be used. Additionally, lower pressures can be used, for example down to about 0.5 atms, or about 0.01 atms, or about 0.001 atms. While permissible, however, these more extreme pressures are not required.

Further, in some embodiments, the reactions for producing $SF_4$, $SF_5Cl$, $SF_5Br$ and $SF_6$ described herein can be carried out in one or more physical configuration that increases the reaction surface area of the solid phase reactants. For example, the solid phase reactants can be spray-dried, finely dispersed, or otherwise subjected to commonly used methods which increase the surface area. In some example embodiments, the reactants for producing $SF_4$, $SF_5Cl$, $SF_5Br$ and $SF_6$ can be physically or mechanically agitated to aid the reactions. For example, inversion, milling/grinding, ball-milling, stirring, rotation, and the like can be used. Such mechanical agitation methods can minimize MFBr or MFCl formation that can mask the effective MF reaction surface area and slow the progression of desired reactions.

The methods described herein theoretically can generate $SF_4$, $SF_5Cl$, $SF_5Br$ and $SF_6$ at near 100% yields. In one example embodiment, the yield is between about 57% and about 96%. In another embodiment the yield is about 95% In another embodiment, the yield is about 75%.

As will be understood by one of ordinary skill in the art, depending on the reactants used and the desired end-products, the conditions of the reaction and the like, the time for a reaction to be substantially complete varies. Substantially complete means a particular reaction is within about 10% of completion, within about 5% of completion or within about 1% or less of completion. Reaction times can be as short as about a few hours to as long as about several days or weeks. In some embodiments, the reactions are substantially complete within less than about 30 days, less than about 17 days, less than about 14 days, less than about 6 days, less than about 4 days, less than about 3 days, less than about 2 days or less than about 1 day. In other embodiments, the reactions are substantially complete within less than about 8 hours, less than about 4 hours or less than about 3 hours.

Reactions described herein can be modified by those skilled in the art. As such, altering the order of adding and mixing of reactants and reagents, adjusting relative molar ratios of reactants, as well as altering reaction times, temperatures and pressures, to more precisely control specific reaction outcomes, and maximizing the ease and production of the desired end product are within the scope of the present description.

The following examples are included to demonstrate embodiments of the disclosed methods and processes. It should be appreciated by those of ordinary skill in the art that the techniques disclosed in the examples which follow represent techniques discovered by the inventor to function well in the practice of the present disclosure, and thus can be considered to constitute preferred modes for its practice. However, those of ordinary skill in the art should, in light of the present disclosure, appreciate that many changes can be made in the specific embodiments which are disclosed and still obtain a like or similar result.

Example 1. Formation of $SF_4$

Anhydrous fine grain KF powder (about 5.09 g) was dried in a stainless steel 100-ml Hoke bomb tube reactor at about 150° C. to about 200° C., for about 1 hour, at high vacuum (about 0.05 to about 0.1 torr). The reactor was allowed to cool to ambient temperature, opened, and fine-grain S powder (about 0.69 g) was added. $Cl_2$ (about 3.13 g) and $Br_2$ (about 1.5 g) were then added to the reactor vessel by condensation to produce a molar ratio of $S:Cl_2:KF:Br_2$ of about 1.0:2.0:4.1:0.44. The vessel was kept at ambient temperature overnight and little or no $SF_5Cl$ and $SF_4$ were detected from the infrared (IR) spectrum of the gaseous phase. IR spectrometry was performed using a Model 4020 Galaxy FTIR spectrophotometer (Mattson Instruments, Madison, Wis. 53711, USA). No change in the IR spectrum was noticed after about four more days. More $Br_2$ (about 5.5 g) was added to the reactor vessel by condensation to produce a new molar ratio of: $S:Cl_2:KF:Br_2$ of about 1:2.0:4.1:2.0. After about 4 days at ambient temperature, a very strong $SF_4$-specific spectral signal was observed (e.g. band groups centered at about 876 cm$^{-1}$ and about 730 cm$^{-1}$), which was accompanied by a very weak $SF_5Cl$ IR spectral signal (e.g. band groups centered at about 909 cm$^{-1}$, about 855 cm$^{-1}$ and about 602 cm$^{-1}$), The reaction displayed a high degree of conversion to $SF_4$, as indicated by the IR spectrum. This example illustrates that: 1.) increasing the molar ratio of $Br_2$ appears to promote the formation of $SF_4$, and 2.) $SF_4$ can be efficiently synthesized within about 4 days at ambient temperatures in the reaction:

$$4KF+S+2Cl_2+(Br_2)\rightarrow SF_4+4KCl+(Br_2)$$

Example 2. Formation of $SF_4$ at an Elevated Temperature

Anhydrous fine-grain KF powder (about 10.50 g) was dried in a stainless steel 100-ml Hoke bomb tube reactor at about 150° C. to 200° C., for about 1 hour, at high vacuum. The reactor was allowed to cool to ambient temperature, opened, and fine-grain S powder (about 1.37 g) was added. $Cl_2$ (about 6.1 g) and $Br_2$ (about 14.3 g) were then added to the reactor vessel by condensation to produce a molar ratio of $S:Cl_2:KF:Br_2$ of about 1.00:2.00:4.23:2.09. The vessel was then kept at a temperature of 65-70° C. for 30 days. Initially, some $SF_5Cl$ besides $SF_4$ was detected in the IR spectrum of the gaseous constituents of the reactor bomb tube, but it disappeared in the course of time and no $SF_5Cl$ was detected after 30 days, only $SF_4$. (IR spectrometry was performed). The reactor vessel bomb tube was cooled to −78° C., and pumped on through a liquid-nitrogen cooled cold trap for two hours. The crude product (4.6 g) was stored in a reactor vessel bomb tube over sulfur (20 g) for 20 hours to remove excess chlorine that might be present. After cooling the sulfur-treatment vessel to −78° C., the product was collected in a cold trap (liquid nitrogen) as before. A yellow tinge was removed by treatment with Hg. The final mass of the recovered $SF_4$ end product was about 4.08 g for a calculated yield of about 88% (based upon sulfur). The final $SF_4$ product appeared as a colorless liquid (when cold), showing the characteristic bands of $SF_4$ in the IR spectrum. This example illustrates that: 1.) increasing the temperature appears to promote the formation of $SF_4$, and 2.) $SF_4$, free of $SF_5Cl$, can be efficiently synthesized in the reaction:

$$4KF+S+2Cl_2+(Br_2)\rightarrow SF_4+4KCl+(Br_2)$$

Example 3. Alternate Formation of $SF_4$ in the Absence of $Cl_2$

Anhydrous fine-grain KF (about 24.2 g) was dried in a stainless steel 300-ml Hoke bomb tube reactor at about 150° C. to about 200° C., for about 1 hour, at high vacuum. The reactor was allowed to cool to ambient temperature, opened, and fine-grain S powder (about 3.24 g) was added. Br$_2$, representing a molar ratio of S to Br$_2$ of greater than about two (about 86.4 g), was then added to the reactor vessel by condensation to produce a final molar ratio of S:KF:Br$_2$ of about 1.00:4.10:5.30. After about 3 days at ambient temperature, a strong SF$_4$ IR spectral signal was observed and the reaction displayed a high degree of conversion to SF$_4$. After an additional 3 days at ambient temperature, no significant change was noticed in the IR spectrum.

The final SF$_4$ product was isolated as follows: The reaction vessel was cooled on a dry ice bath (about −78° C.) and connected via a liquid nitrogen cold trap (about −196° C.) to a vacuum pump. After about 1.5 hours, about 11.5 grams of a light brown, presumably bromine-contaminated crude product was obtained. To remove residual contaminants (e.g. Br$_2$, Sulfur Bromides), the crude product was condensed into a large glass pressure vessel containing about 10 grams of Hg to remove trace amounts of any discoloring contaminants (i.e. e.g. Br$_2$). After brief shaking at about 0° C., the product was condensed into a cold trap and obtained as a colorless liquid. The final mass of the recovered end product was about 10.5 g for a calculated yield of about 96% (based upon sulfur). The IR spectrum of the end product revealed a substantially pure sample of SF$_4$, with a small contamination by SOF$_2$ (e.g. band groups centered at about 1340 cm$^{-1}$ and about 808 cm$^{-1}$ and about 750 cm$^{-1}$). This example illustrates that: SF$_4$ can be efficiently synthesized in the absence of Cl$_2$ within about 3 days at ambient temperatures, in the reaction:

4KF+S+2Br$_2$→SF$_4$+4KBr

Example 4. Alternate Formation of SF$_4$ Using Coarse-Grain KF and Agitation by Ball-Milling Anhydrous coarse grain KF (about 28.1 g) was dried in a stainless steel 300-ml Hoke bomb tube reactor containing 19, ½ inch 316 grade stainless steel balls, at about 150° C. to about 200° C., for about 1 hour, at high vacuum. The reactor was allowed to cool to ambient temperature, opened, and fine-grain S powder (about 3.8 g) was added. Bromine, (about 63.1 g), was then added to the reactor vessel to produce a final molar ratio of S:KF:Br$_2$ of about 1.00:4.10:3.30. After rotating the reaction vessel for about 4 days at ambient temperature, a strong SF$_4$ IR spectral signal was observed and the reaction displayed a high degree of conversion to SF$_4$.

The final SF$_4$ product was isolated as follows: The reaction vessel was cooled to about −78° C. and connected via a cold trap (about −196° C.) to a vacuum pump. After about 5 hours, about 9.8 grams of a light brown, presumably bromine-contaminated crude product was obtained. A low temperature vacuum transfer was performed, yielding a very light brown liquid. The final mass of the recovered SF$_4$ end product was estimated about 7.3 g for a calculated yield of about 57% (based upon sulfur). The IR spectrum of the end product revealed a substantially pure sample of SF$_4$, with a small contamination by SOF$_2$. This example illustrates that: SF$_4$ can be efficiently synthesized in the absence of Cl$_2$ using coarse-grain KF and ball-milling agitation within about 4 days at ambient temperatures, in the reaction:

4KF+S+2Br$_2$→SF$_4$+4KBr

Example 5. Alternate Formation of SF$_4$ at Elevated Temperature

Anhydrous fine-grain KF (about 17.1 g) was dried in a stainless steel 300-ml Hoke bomb tube reactor at about 150° C. to about 200° C., for about 1 hour under high vacuum. The reactor was allowed to cool to ambient temperature, opened, and fine-grain S powder (about 2.3 g) was added. Br$_2$ (about 36.3 g), was then added to the reactor vessel to produce a final molar ratio of S:KF:Br$_2$ of about 1.00:4.10:3.20. The reactor vessel was heated to about 60° C. for about 3 hours and the formation SF$_4$ product was monitored by IR spectroscopy. The reaction vessel was cooled to about −78° C. and the SF$_4$ product was pumped into a liquid nitrogen cold trap. The mass of the crude SF$_4$ product indicated about 50% chemical yield. After recondensation of the SF$_4$ product into the reaction vessel, it was heated for another about 2 hours at about 72° C., and another about 4 hours at about 80 to about 86° C. Isolation of the SF$_4$ product was accomplished by cooling the reaction vessel to about −78° C. and pumping under high vacuum for about 1.5 hours into a liquid nitrogen cold trap. Debromination was performed by brief shaking in large Carius tube containing about 20 g. of Hg at about 0° C. About 6.7 grams of purified SF$_4$ was recovered containing a small amount of SOF$_2$, as judged by IR spectroscopy. The final calculated yield was about 86% (based upon sulfur). This example illustrates that SF$_4$ can be efficiently synthesized at mildly elevated temperature, within about 9 hours, in the reaction:

4KF+S+2Br$_2$→SF$_4$+4KBr

Example 6. Alternate Formation of SF$_4$ while Limiting Br$_2$

Anhydrous fine grain KF (about 24.12 g) was dried in a stainless steel 300-ml Hoke bomb tube reactor at about 150° C. to about 200° C., for about 1 hour, at high vacuum. The reactor was allowed to cool to ambient temperature, opened, and fine-grain S powder (about 3.16 g) was added. Br$_2$ (about 31.1 g), was then added to the reactor vessel to produce a final molar ratio of S:KF:Br$_2$ of about 1.00:4.21:1.97. The reaction vessel was then cooled with liquid nitrogen and evacuated. The reaction vessel was kept at ambient temperature for about 6 days, and then heated at about 80° C. for about 8 hours. The reaction vessel was cooled to about −78° C. and the volatile material was pumped into a liquid nitrogen cooled cold trap until transfer apparently ceased. The contents of the cold trap were transferred to a second cold trap, leaving a brown residue in the first cold trap. The transferred material was condensed into a large glass pressure vessel containing about 10 grams of Hg to remove trace amounts of. Br$_2$. About 7.31 g of colorless product was again condensed into a liquid nitrogen cooled cold trap. The recovered end product appeared as colorless product of about 7.31 g mass, for a calculated yield of about 70% (based upon Br$_2$). The IR spectrum of the end product revealed a substantially pure sample of SF$_4$. This example illustrates that it is advantageous to use more than the required stoichiometric amount of bromine in the reaction:

4KF+S+2Br$_2$→SF$_4$+4KBr

Example 7. Formation of SF$_5$Cl

Anhydrous fine grain CsF (about 10.95 g) was dried under high vacuum at about 100° C. in a stainless steel 300-ml Hoke bomb tube reactor, whereupon SF$_4$ (about 9.17 g), Cl$_2$ (about 3.20 g) and bromine (about 36.8 g) were added consecutively by vacuum condensation at liquid-nitrogen temperature (about −196° C.) to produce a molar ratio of $SF_4$:CsF:$Cl_2$:$Br_2$ of about 1.00:0.85:0.53:2.71. The vessel was set aside at ambient temperature for about 5 days, and an IR spectrum of the gaseous constituents showed very strong bands or band groups corresponding to $SF_5Cl$. This example illustrates that $SF_5Cl$ can be efficiently synthesized within about 5 days at ambient temperatures using $Cl_2$, $Br_2$, and $SF_4$, in the reaction:

$$CsF+SF_4+Cl_2+(Br_2) \rightarrow SF_5Cl+CsCl+(Br_2)$$

Example 8. Alternate Formation of $SF_5Cl$ Using a Different Metal Fluoride

KF (about 5.0 g) was dried at about 150° C. to about 200° C. in a stainless steel 100-ml Hoke bomb tube reactor, for about 1 hour, at high vacuum. $Br_2$ (about 9.71 g), $Cl_2$ (about 3.54 g) and $SF_4$ (about 4.71 g) were added to the bomb tube reactor by condensation to produce a molar ratio of: $SF_4$:$Cl_2$:KF:$Br_2$ of about 1.00:1.14:1.98:1.39. The reaction appeared almost complete after about 2 days at ambient temperature, as determined from the IR spectrum (i.e. a strong $SF_5Cl$ to $SF_4$ IR spectral signals was observed). The reactants were then heated for about 2 days at about 115° C., and an IR spectrum of the gaseous phase showed very little signal corresponding to $SF_4$. This example illustrates that $SF_5Cl$ can be efficiently synthesized within about 2 to 4 days at ambient or mildly elevated temperatures using $Cl_2$, $Br_2$, and $SF_4$, in the reaction:

$$KF+SF_4+Cl_2+(Br_2) \rightarrow SF_5Cl+KCl+(Br_2)$$

Example 9. Alternate Formation of $SF_5Cl$ Using S Instead of $SF_4$

KF (about 15.60 g) was added to a stainless steel 300-ml Hoke bomb tube reactor and dried at about 150° C. to about 200° C., for about 1 hour, at high vacuum. The bomb reactor was opened and fine-grain S powder (about 1.50 g) was added. After resealing the reactor, $Cl_2$ (about 9.03 g) and $Br_2$ (about 8.59 g) were added by condensation to produce a molar ratio of: S:$Cl_2$:KF:$Br_2$ of about 1.00:2.71:5.71:1.15. The pressure reactor was kept at ambient temperature overnight and both $SF_5Cl$ and $SF_4$ were detected from the IR spectrum. No change in the IR spectrum was noticed after about three days. More $Cl_2$ was added (about 1.20 g), bringing the molar ratio to: S:$Cl_2$:KF:$Br_2$ of about 1.00:3.26:5.72:1.15. The reaction was occasionally monitored by IR spectroscopy. After about two more weeks at ambient temperature, the reaction was substantially complete as judged by IR spectrometry. This example illustrates that 1.) compared to other $SF_4$-producing reactions, increasing the molar ratios of $Cl_2$ and KF promotes the production of $SF_5Cl$ over $SF_4$ in this reaction, and 2.) $SF_5Cl$ can be efficiently synthesized, at ambient temperatures within weeks, in the reaction: $5\ KF+S+3Cl_2+(Br_2) \rightarrow SF_5Cl+5KCl$.

Example 10. Formation of $SF_5Cl$

KF (about 10.55 g) was dried under high vacuum in a stainless steel 100-ml Hoke bomb tube reactor and dried for about 1 hour at about 150° C. to about 200° C. The reactor was opened and fine-grain S powder (about 1.13 g) was added. After resealing the reactor, $Cl_2$ (about 8.15 g) and $Br_2$ (about 7.99 g) were added by condensation to produce a stoichiometric ratio of S:$Cl_2$:KF:$Br_2$ of about 1.00:3.25:5.15:1.41 (reaction "A"). A second, similar reaction was prepared utilizing about 1.58 g of fine-grain S powder and the same molar ratios of the other constituents (reaction "B"). The reaction "A" and "B" vessels were placed at ambient temperature for about 3 days and the successful production of $SF_4$ and $SF_5Cl$ was noted by IR spectroscopy. Thereafter, $SF_4$ and $SF_5Cl$ were monitored every 2 to about 3 days by IR spectroscopy, and by about day 13, it was evident that the reaction was not at completion, and that the production of $SF_4$ and $SF_5Cl$ had slowed significantly. The volatile components of both reaction vessels were then condensed and combined into a third vessel containing about 7.94 grams of KF. After about 4 more days at ambient temperature, IR spectroscopy revealed that all the remaining $SF_4$ appeared to have been consumed, leaving $SF_5Cl$ as the apparent sole product.

The final product was isolated in the following manner: 1.) The reaction vessel was cooled to about −78° C. and connected via a cold trap (about −196° C.) to a vacuum pump. After about 6 hours, about 15.5 grams of a light yellowish crude product was obtained. To remove residual contaminants (e.g. $Cl_2$, $Br_2$, Sulfur Chlorides), the crude product was kept overnight in a pressure reactor, over about 3 grams of S. The product was pumped out of this vessel, cooled to about −78° C. and connected via a cold trap (about −196° C.) to a pump and then condensed into a large cold trap containing a small amount of mercury to remove trace amounts of any discoloring contaminants (e.g. $Br_2$, Sulfur Chlorides). The product was obtained as a colorless liquid. The final mass of the recovered end product was about 13.10 g for a calculated yield of about 95% (based upon Sulfur). The IR spectrum of the end product revealed a pure sample of $SF_5Cl$.

This example illustrates that 1.) Additional KF may be required to recharge the $SF_5Cl$-producing reaction and drive it to completion or near completion. 2.) The production of $SF_5Cl$ may be slowed by a reduction of reaction-accessible KF, perhaps due to the buildup of unreactive KCl on the exposed surfaces of the KF; which may be rectified by the addition of fresh KF, agitation of the reaction vessel, or other methods that may increase reactive surface area of the KF over the reaction time. 3.) From the reaction: $5\ KF+S+3Cl_2+(Br_2) \rightarrow SF_5Cl+5KCl+(Br_2)$ it is possible to reach complete, or substantially complete $SF_5Cl$ production within about 2 to about 3 weeks at ambient temperature, yielding substantially pure $SF_5Cl$.

Example 11. Formation of $SF_5Cl$

KF (about 10.58 g) was dried under high vacuum for about 1 hour at about 150° C. to about 200° C., in a stainless steel 300-ml Hoke bomb tube pressure reactor. The reactor was opened and S (about 1.1 g) was added. After resealing the reactor, $Cl_2$ (about 9.0 g) was added by condensation to produce a stoichiometric ratio of S:$Cl_2$:KF of about 1.00:3.70:5.30. The reaction vessel was set aside at ambient temperature and no production of either $SF_4$ or $SF_5Cl$ was detected by IR spectroscopy after about 30 days. $Br_2$ (about 7.54 g) was then added by condensation to produce a new stoichiometric ratio of S:$Cl_2$:KF:$Br_2$ of about 1.00:3.70:5.30:1.37. After about 3 days at ambient temperature, production of both $SF_4$ and $SF_5Cl$ was noted by IR spectroscopy. This example illustrates that 1.) Although all the chemical elements required for production of $SF_4$ and $SF_5Cl$ were present in the reaction vessel for a duration of about 30 days, no production of $SF_4$ or $SF_5Cl$ was noted in the absence of $Br_2$ at ambient temperature. 2.) After the necessary components (S, $Cl_2$, KF) of the reaction remained unreactive for 30 days, the subsequent addition of $Br_2$, within days, promoted the efficient formation of $SF_4$ and $SF_5Cl$ at ambient temperatures. 3.) $Br_2$ appears to be required for the efficient ambient temperature production of $SF_4$ and $SF_5Cl$ from the reactants KF, S and $Cl_2$.

Example 12. Formation of $SF_5Br$

AgF (about 11.02 g) was dried under high vacuum at about 150 to about 200° C. $Br_2$ (about 35.5 g) and $SF_4$ (about 7.3 g) were added to a 300-ml Hoke bomb tube pressure reactor by condensation to produce a molar ratio of: $SF_4$: AgF:$Br_2$ of about 1.00:1.28:3.30. The reaction vessel was then placed into an about 100° C. boiling water bath and subsequently monitored by IR spectroscopy at about 2, about 6.5, about 15 and about 79 hours. The IR spectra indicated a progressive accumulation of $SF_5Br$ (e.g. band groups centered at about 891 cm$^{-1}$ and about 854 cm$^{-1}$ and about 594 cm$^{-1}$), and a reduction in $SF_4$, as exemplified by observing an increasing ratio of $SF_5Br$ to $SF_4$ IR spectral signals over time.

The final product was isolated in the following manner: The reaction vessel was cooled to about −78° C. and connected via a cold trap (about −196° C.) to a vacuum pump. After about 3 hours, about 9.3 grams of a light yellowish crude product was obtained in the cold trap. The product was vacuum transferred from the cold trap to a Carius tube containing a small amount of mercury to remove trace amounts of any discoloring contaminants (e.g. $Br_2$). The product was obtained as a pale straw-yellow liquid. The final mass of the recovered end product was about 8.55 g for a calculated yield of about 75.4% (based upon $SF_4$). The IR spectrum of the end product revealed a substantially pure sample of $SF_5Br$. This example illustrates that: 1.) $SF_5Br$ can be efficiently synthesized within about 79 hours at 100° C. in the reaction:

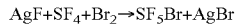

Example 13. Formation of $SF_5Br$ Using an Alternate Metal Fluoride $AgF_2$ (about 2.33 g) was dried under high vacuum at about 150 to about 200° C. in a 100-ml Hoke bomb tube pressure reactor. $Br_2$ (about 12.95 g) and $SF_4$ (about 3.14 g) were added to the reactor by condensation to produce a molar ratio of: $SF_4$:$AgF_2$:$Br_2$ of about 1.00:0.55:2.78. The reaction vessel was then placed at 100° C. and subsequently monitored by IR spectroscopy at about 52 hours. The IR spectrum indicated very strong bands or band groups indicative of $SF_5Br$, very weak bands or band groups corresponding to $SF_4$ and $SOF_2$ and medium-strength bands or band groups corresponding to $SF_6$ (e.g. medium-strength band centered at about 947 cm$^{-1}$). This example illustrates that: 1.) $SF_5Br$ can be efficiently synthesized within about 52 hours at about 100° C. in the reaction:

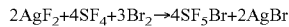

Example 14. Formation of $SF_6$ $CoF_3$ (about 4.2 g) was dried under high vacuum at about 150 to about 200° C. in a 100-ml Hoke bomb tube pressure reactor. $Br_2$ (about 22.0 g) and $SF_4$ (about 4.63 g) were added to the pressure reactor by condensation to produce a molar ratio of: $SF_4$:$CoF_3$:$Br_2$ of about 1.00:0.84:3.21. The reaction vessel was then placed at about 100° C. and subsequently monitored by IR spectroscopy at about 52 hours. The IR spectrum indicated strong bands or band groups indicative of $SF_6$, moderate-strength bands or band groups corresponding to $SF_4$ and weak bands or band groups corresponding to $SOF_2$. No indication of $SF_5Br$ was evident form the IR spectrum. This example indicates that: 1.) $SF_6$ can be efficiently synthesized within about 52 hours at about 100° C. in the reaction:

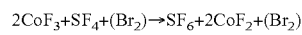

Example 15. Comparative Example

To determine if an alternate MF could efficiently replace KF as a reactant in the production of SF4, anhydrous fine-grain NaF (about 16.94 g) was dried in a stainless steel Hoke bomb tube pressure reactor at about 150° C. to about 200° C., for about 1 hour, at high vacuum. The reactor was allowed to slowly cool to ambient temperature, opened, and sulfur (about 2.17 g) was added. $Br_2$ (about 29.5 g), was then added to the reactor vessel to produce a final molar ratio of S:NaF:$Br_2$ of about 1.00:5.90:2.70. After about 2 days at ambient temperature, no $SF_4$ was evident as measured by IR spectroscopy of the gaseous constituents removed from the reaction vessel. The reaction vessel was then heated to about 80° C. for about 18 hours, IR spectroscopy of the gaseous constituents again revealed that no reaction products ($SF_4$, $SOF_2$) were present. The reaction vessel was subsequently heated to about 155° C. for about 18 hours, IR spectroscopy of the gaseous constituents revealed very low levels $SOF_2$ and no $SF_4$, suggesting the formation of only traces of $SF_4$, which were apparently hydrolyzed by the minuscule amount of water introduced into the reaction vessel.

Example 16. Comparative Example

To determine if an alternate MF could efficiently replace KF as reactant in the production of $SF_5Cl$ from $SF_4$, a 100-ml stainless steel Hoke bomb tube reactor was charged with NaF (about 10.19 g), and after drying under high vacuum as described above, the reactor was then charged with chlorine (about 4.77 g), bromine (about 11.57 g) and $SF_4$ (about 14.61 g), consecutively, by vacuum condensation. The molar ratio of $SF_4$:NaF:$Cl_2$:$Br_2$ equaled about 1.00:1.79:1.10:1.50. The reaction was allowed to occur without agitation at ambient temperature for about 11 days, after which time no reaction was apparent from the IR spectrum. Heating of the reaction vessel for an additional about 9 days at about 115 to about 125° C. did not result in the formation of $SF_5Cl$, as indicated by IR spectroscopy.

Example 17. Comparative Example $CuF_2$ (about 4.59 g) was dried for about 1 hour under high vacuum at about 150 to about 200° C. $Br_2$ (about 18.9 g) and $SF_4$ (about 3.21 g) were added to the pressure reactor by condensation to produce a molar ratio of: $SF_4$:$CuF_2$:$Br_2$ of about 1.00:1.54:3.72. The reaction vessel was then placed at about 100° C. and subsequently monitored by IR spectroscopy at about 52 hours. The IR spectrum indicated that no reaction had occurred.

Example 18. Comparative Example

TlF (about 4.23 g) was dried under high vacuum at about 150 to about 200° C., for about 1 hour. $Br_2$ (about 7.6 g) and $SF_4$ (about 1.38 g) were added to the pressure reactor by condensation to produce a molar ratio of: $SF_4$:TlF:$Br_2$ of about 1.00:1.49:3.86. The reaction vessel was then placed at 100° C. and subsequently monitored by IR spectroscopy at about 52 hours. The IR spectrum indicated that no reaction had occurred.

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

The terms "a," "an," "the" and similar referents used in the context of describing the invention (especially in the context of the following claims) are to be construed to cover both the singular and the plural, unless otherwise indicated herein or clearly contradicted by context. Recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member may be referred to and claimed individually or in any combination with other members of the group or other elements found herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Certain embodiments of this invention are described herein, including the best mode known to the inventors for carrying out the invention. Of course, variations on these described embodiments will become apparent to those of ordinary skill in the art upon reading the foregoing description. The inventor expects skilled artisans to employ such variations as appropriate, and the inventors intend for the invention to be practiced otherwise than specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

Furthermore, numerous references have been made to patents and printed publications throughout this specification. Each of the above-cited references and printed publications are individually incorporated herein by reference in their entirety.

In closing, it is to be understood that the embodiments of the invention disclosed herein are illustrative of the principles of the present invention. Other modifications that may be employed are within the scope of the invention. Thus, by way of example, but not of limitation, alternative configurations of the present invention may be utilized in accordance with the teachings herein. Accordingly, the present invention is not limited to that precisely as shown and described.

What is claimed is:

1. A method of producing $SF_4$ comprising: admixing a sulfur reactant, KF, and $Br_2$, wherein:
   the sulfur reactant, the KF, and the $Br_2$ react at temperatures from about 10° C. to about 27° C.;
   the reaction is within about 10% of completion in less than about 3 days; and
   the sulfur reactant, the KF, and the $Br_2$ react to produce the $SF_4$ in the absence of reaction solvents.

2. A method according to claim 1, wherein the sulfur reactant is S, $S_2Cl_2$, $SCl_2$, $S_2Br_2$, $SBr_2$, or a combination thereof.

3. A method of producing $SF_4$ comprising: admixing a sulfur reactant, KF, $Cl_2$, and $Br_2$, wherein:
   the sulfur reactant, the KF, the $Cl_2$, and the $Br_2$ react at temperatures from about 10° C. to about 27° C.;
   the reaction is within about 10% of completion in less than about 3 days; and
   the sulfur reactant, the KF, the $Cl_2$, and the $Br_2$ react to produce the $SF_4$ in the absence of reaction solvents.

4. A method according to claim 3, wherein the sulfur reactant is S, $S_2Cl_2$, $SCl_2$, $S_2Br_2$, $SBr_2$, or a combination thereof.

5. A method according to claim 1, wherein the sulfur reactant is S.

6. A method according to claim 1, wherein the sulfur reactant, the KF, and the $Br_2$ react to produce the $SF_4$ at a yield of at least 10%.

7. A method according to claim 1, wherein the sulfur reactant, the KF, and the $Br_2$ react to produce the $SF_4$ at a yield from about 57% to about 96%.

8. A method according to claim 3, wherein the sulfur reactant is S.

9. A method of producing $SF_4$ comprising: admixing a sulfur reactant, KF, and $Br_2$, wherein:
   the sulfur reactant, the KF, and the $Br_2$ react at temperatures from about 27° C. to about 80° C.;
   the reaction provides a yield of $SF_4$ within about 57% to about 96% in less than about 1 day; and
   the sulfur reactant, the KF, and the $Br_2$ react to produce the $SF_4$ in the absence of reaction solvents.

10. A method according to claim 9, wherein the sulfur reactant is S.

11. A method of producing $SF_4$ comprising: admixing a sulfur reactant, KF, and $Br_2$, wherein:
    the sulfur reactant, the KF, and the $Br_2$ react at temperatures from about 10° C. to about 115° C.;
    the reaction provides a yield of $SF_4$ within about 57% to less than 100%; and
    the sulfur reactant, the KF, and the $Br_2$ react to produce the $SF_4$ in the absence of reaction solvents.

12. A method according to claim 11, wherein the sulfur reactant, the KF, and the $Br_2$ produce $SF_4$ at temperatures from about 10° C. to about 40° C.

13. A method according to claim 11, wherein the sulfur reactant, the KF, and the $Br_2$ produce $SF_4$ at temperatures from about 10° C. to about 27° C.

14. A method according to claim 11, wherein the sulfur reactant, the KF, and the $Br_2$ produce $SF_4$ at temperatures from about 27° C. to about 115° C.

15. A method according to claim 11, wherein the yield of $SF_4$ is from about 57% to about 96%.

* * * * *